US011057916B2

(12) United States Patent
Ji et al.

(10) Patent No.: US 11,057,916 B2
(45) Date of Patent: Jul. 6, 2021

(54) METHODS AND APPARATUS FOR INDICATION INFORMATION COMMUNICATION (71) Applicant: Huawei Technologies Co., Ltd., Shenzhen (CN)

(72) Inventors: Tong Ji, Beijing (CN); Zhe Jin, Beijing (CN); Weiliang Zhang, Shanghai (CN); Xiaolei Tie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 16/579,311

(22) Filed: Sep. 23, 2019

(65) Prior Publication Data

US 2020/0022170 A1 Jan. 16, 2020

Related U.S. Application Data (63) Continuation of application No. PCT/CN2017/078113, filed on Mar. 24, 2017.

(51) Int. Cl.
*H04W 72/12* (2009.01)
*H04W 76/28* (2018.01)
*H04W 76/11* (2018.01)
*H04W 68/00* (2009.01)
*H04W 72/04* (2009.01)
(Continued)

(52) U.S. Cl.
CPC ... *H04W 72/1273* (2013.01); *H04W 52/0235* (2013.01); *H04W 68/005* (2013.01); *H04W 72/042* (2013.01); *H04W 72/0446* (2013.01); *H04W 72/0466* (2013.01);
(Continued)

(58) Field of Classification Search
CPC . H04W 72/1273; H04W 76/28; H04W 76/11; H04W 68/005; H04W 72/042; H04W 72/0446; H04W 72/0466; H04W 74/0808; H04W 52/0235; Y02D 30/70
See application file for complete search history.

(56) References Cited

U.S. PATENT DOCUMENTS

2012/0213137 A1  8/2012  Jeong et al.
2013/0094457 A1  4/2013  Seo et al.
(Continued)

FOREIGN PATENT DOCUMENTS

CN  101483446 A   7/2009
CN  101583178 A  11/2009
(Continued)

OTHER PUBLICATIONS

Huawei et al., "Discussion on wake up signal", 3GPP Draft; R1-1703333, Feb. 12, 2017, 5 pages.
(Continued)

*Primary Examiner* — Omar J Ghowrwal
(74) *Attorney, Agent, or Firm* — Slater Matsil, LLP (57) ABSTRACT Embodiments of this disclosure provide an indication information transmission method and an apparatus, and relate to the communications field. The method includes: generating, by a network device, indication information, where the indication information is used to indicate an existence status of a downlink control signal in a first time period; and sending, by the network device, the indication information to a terminal device.

20 Claims, 3 Drawing Sheets (51) Int. Cl.
*H04W 74/08* (2009.01)
*H04W 52/02* (2009.01)

(52) U.S. Cl.
CPC ........ *H04W 74/0808* (2013.01); *H04W 76/11* (2018.02); *H04W 76/28* (2018.02); *Y02D 30/70* (2020.08)

(56) References Cited

U.S. PATENT DOCUMENTS

| | | | | |
|---|---|---|---|---|
| 2015/0092647 | A1* | 4/2015 | Tabet | H04L 5/0044 370/311 |
| 2017/0280481 | A1* | 9/2017 | Stern-Berkowitz | H04W 74/008 |
| 2018/0220438 | A1* | 8/2018 | Liu | H04W 72/1236 |
| 2020/0128363 | A1* | 4/2020 | Yavuz | H04L 1/0003 |

FOREIGN PATENT DOCUMENTS

| | | |
|---|---|---|
| CN | 102625421 A | 8/2012 |
| CN | 102612849 B | 8/2015 |
| CN | 105992318 A | 10/2016 |
| JP | 2014506770 A | 3/2014 |
| WO | 2011160799 A1 | 12/2011 |
| WO | 2016163464 A1 | 10/2016 |

OTHER PUBLICATIONS

3GPP TS 36300 V8.2.0 (Sep. 2007); 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 8); 109 pages.

3GPP TS 36.213 V142.0 (Mar. 2017); 3rd Generation Partnership Project;Technical Specification Group Radio Access Network; Evolved Universal Terrestrial Radio Access (E-UTRA); Physical layer procedures(Release 14); 454 pages.

3GPP TS 36.300 V14.1.0 (Dec. 2016); 3rd Generation Partnership Project;Technical Specification Group Radio Access Network; Evolved Universal Terrestrial Radio Access (E-UTRA) and Evolved Universal Terrestrial Radio Access getwork (E-UTRAN); Overall description;Stage 2 (Release 14); 317 pages.

3GPP TS 36.304 V14.2.0 (Mar. 2017); 3rd Generation Partnership Project;Technical Specification Group Radio Access Network; Evolved Universal Terrestrial Radio Access (E-UTRA); User Equipment (UE) procedures in idle mode (Release 14); 49 pages.

3GPP TS 36321 V14.2.0 (Mar. 2017);3rd Generation Partnership Project;Technical Specification Group Radio Access Network;Evolved Universal Terrestrial Radio Access (E-UTRA);Medium Access Control (MAC) protocol specification (Release 14);106 pages.

3GPP TS 36.331 V14.2.0 (Mar. 2017);3rd Generation Partnership Project;Technical Specification Group Radio Access Network;Evolved Universal Terrestrial Radio Access (E-UTRA);Radio Resource Control (RRC);Protocol specification (Release 14);total 721 pages.

Huawei et al.,"On 'wake-up signal' for paging and connected-mode DRX",3GPP TSG RAN WG1 Meeting #89 R1-1707021,Hangzhou, China, May 15-19, 2017, total 10 pages.

Huawei et al.,"New WID on Further NB-IoT enhancements",#3GPP TSG RAN Meeting #75 RP-170852,Dubrovnik, Croatia, Mar. 6-9, 2017,total 6 pages.

NTT DOCOMO, Inc., "Discussion on paging design for NR", 3GPP TSG RAN WG1 Meeting #88, R1-1702829, Feb. 13-17, 2017, 5 pages, Athens, Greece.

* cited by examiner

METHODS AND APPARATUS FOR INDICATION INFORMATION COMMUNICATION

CROSS-REFERENCE TO RELATED APPLICATIONS

This application is a continuation of International Application No. PCT/CN2017/078113, filed on Mar. 24, 2017. The disclosure of which is hereby incorporated by reference in its entirety.

TECHNICAL FIELD

This disclosure relates to the communications field, and in particular, to an indication information transmission method and an apparatus.

BACKGROUND

Machine type communication (MTC) (also referred to as machine-to-machine (M2M) communication or the Internet of things (IoT)) is an important disclosure in the future communications field. In an IoT system, an important IoT communications system is a communications system based on an existing cellular architecture, and is referred to as cellular IoT. In a cellular IoT communications system, between an MTC base station and a terminal device, a very high data transmission rate is usually not needed, but a very large coverage area is needed. When the terminal device communicates with the MTC base station, the terminal device has relatively strict requirements on power consumption and device costs. Therefore, a capability of the terminal device is often limited.

Narrowband Internet of things (NB-IoT) is a feature in a release 13 of long term evolution (LTE), and is mainly for some Internet of things scenarios. In the NB-IoT, a physical downlink control channel (PDCCH) carries scheduling information of downlink data, to help a terminal device to obtain configuration information of a physical downlink shared channel (PDSCH), and receive related information of the PDSCH.

Transmission on the PDCCH is usually based on a form of search space. To be specific, the terminal device needs to listen to search space to obtain a target PDCCH signal. However, sometimes there is no valid PDCCH in the search space, but the terminal device still needs to listen to a PDCCH signal. Consequently, a waste of power consumption of the terminal device is caused

SUMMARY

Embodiments of this disclosure provide an indication information transmission method and an apparatus.

According to a first aspect, this disclosure provides an indication information transmission method, including: generating, by a network device, indication information, where the indication information is used to indicate an existence status of a downlink control signal in a first time period; and sending, by the network device, the indication information to a terminal device, where the existence status includes at least one of the following: that the downlink control signal exists in the first time period; that the downlink control signal does not exist in the first time period; a time resource location of the downlink control signal in the first time period; a frequency resource location of the downlink control signal in the first time period; a quantity of transmissions of the downlink control signal in the first time period; a quantity of repetitions of the downlink control signal in the first time period; transmission duration of the downlink control signal in the first time period; and a signal format of the downlink control signal in the first time period.

In a possible implementation of the first aspect, the time resource location of the downlink control signal in the first time period is a start location of the downlink control signal in the first time period or a candidate number of the downlink control signal in the first time period.

In a possible implementation of the first aspect, a start location of the first time period is a first time location after a transmission end moment of the indication information, and a length of the first time period is a positive integer quantity of downlink control channel periods.

In a possible implementation of the first aspect, an interval between the first time location and a last subframe in which the indication information is transmitted is indicated based on a system message or high layer signaling and/or is determined according to a preset rule.

In a possible implementation of the first aspect, the downlink control signal is scrambled by using a random access radio network temporary identifier, a cell radio network temporary identifier, a temporary cell radio network temporary identifier, a group radio network temporary identifier, a single cell radio network temporary identifier, or a paging radio network temporary identifier.

In a possible implementation of the first aspect, configuration information of the indication information is indicated based on the system message or other high layer signaling and/or is determined according to the preset rule.

In a possible implementation of the first aspect, the configuration information of the indication information is indicated in a first message, and the first message includes configuration information of downlink control signal search space indicated by the indication information.

According to a second aspect, this disclosure provides an indication information transmission method, including: receiving, by a terminal device, indication information sent by a network device, where the indication information is used to indicate an existence status of a downlink control signal in a first time period; and determining, by the terminal device, whether to listen to the downlink control signal according to the indication information, where the existence status includes at least one of the following: that the downlink control signal exists in the first time period; that the downlink control signal does not exist in the first time period; a time resource location of the downlink control signal in the first time period; a frequency resource location of the downlink control signal in the first time period; a quantity of transmissions of the downlink control signal in the first time period; a quantity of repetitions of the downlink control signal in the first time period; transmission duration of the downlink control signal in the first time period; and a signal format of the downlink control signal in the first time period.

In a possible implementation of the second aspect, the determining, by the terminal device, whether to listen to the downlink control signal according to the indication information includes: listening to, by the terminal device, the downlink control signal in the first time period when the indication information indicates that the existence status of the downlink control signal in the first time period includes at least one of the following: that the downlink control signal exists in the first time period; the time resource location of the downlink control signal in the first time period; the frequency resource location of the downlink control signal in the first time period; the quantity of transmissions of the downlink control signal in the first time period; the quantity of repetitions of the downlink control signal in the first time period; the transmission duration of the downlink control signal in the first time period; and the signal format of the downlink control signal in the first time period; or skipping, by the terminal device, listening to the downlink control signal in the first time period when the indication information indicates that the downlink control signal does not exist in the first time period.

In a possible implementation of the second aspect, the time resource location of the downlink control signal in the first time period is a start location of the downlink control signal in the first time period or a candidate number of the downlink control signal in the first time period.

In a possible implementation of the second aspect, a start location of the first time period is a first time location after a transmission end moment of the indication information, and a length of the first time period is a positive integer quantity of downlink control channel periods.

In a possible implementation of the second aspect, an interval between the first time location and a last subframe in which the indication information is transmitted is indicated based on a system message or high layer signaling and/or is determined according to a preset rule.

In a possible implementation of the second aspect, the downlink control signal is scrambled by using a random access radio network temporary identifier, a cell radio network temporary identifier, a temporary cell radio network temporary identifier, a group radio network temporary identifier, a single cell radio network temporary identifier, or a paging radio network temporary identifier.

In a possible implementation of the second aspect, configuration information of the indication information is indicated based on the system message or other high layer signaling and/or is determined according to the preset rule.

In a possible implementation of the second aspect, the configuration information of the indication information is indicated in a first message, and the first message includes configuration information of downlink control signal search space indicated by the indication information.

According to a third aspect, this disclosure provides a network device, including: a processing unit, configured to generate indication information, where the indication information is used to indicate an existence status of a downlink control signal in a first time period; and a sending unit, configured to send the indication information to a terminal device, where the existence status includes at least one of the following: that the downlink control signal exists in the first time period; that the downlink control signal does not exist in the first time period; a time resource location of the downlink control signal in the first time period; a frequency resource location of the downlink control signal in the first time period; a quantity of transmissions of the downlink control signal in the first time period; a quantity of repetitions of the downlink control signal in the first time period; transmission duration of the downlink control signal in the first time period; and a signal format of the downlink control signal in the first time period.

In a possible implementation of the third aspect, the time resource location of the downlink control signal in the first time period is a start location of the downlink control signal in the first time period or a candidate number of the downlink control signal in the first time period.

In a possible implementation of the third aspect, a start location of the first time period is a first time location after a transmission end moment of the indication information, and a length of the first time period is a positive integer quantity of downlink control channel periods.

In a possible implementation of the third aspect, an interval between the first time location and a last subframe in which the indication information is transmitted is indicated based on a system message or high layer signaling and/or is determined according to a preset rule.

In a possible implementation of the third aspect, the downlink control signal is scrambled by using a random access radio network temporary identifier, a cell radio network temporary identifier, a temporary cell radio network temporary identifier, a group radio network temporary identifier, a single cell radio network temporary identifier, or a paging radio network temporary identifier.

In a possible implementation of the third aspect, configuration information of the indication information is indicated based on the system message or other high layer signaling and/or is determined according to the preset rule.

In a possible implementation of the third aspect, the configuration information of the indication information is indicated in a first message, and the first message includes configuration information of downlink control signal search space indicated by the indication information.

According to a fourth aspect, this disclosure provides a terminal device, including: a receiving unit, configured to receive indication information sent by a network device, where the indication information is used to indicate an existence status of a downlink control signal in a first time period; and a processing unit, configured to control the receiving unit whether to listen to the downlink control signal according to the indication information, where the existence status includes at least one of the following: that the downlink control signal exists in the first time period; that the downlink control signal does not exist in the first time period; a time resource location of the downlink control signal in the first time period; a frequency resource location of the downlink control signal in the first time period; a quantity of transmissions of the downlink control signal in the first time period; a quantity of repetitions of the downlink control signal in the first time period; transmission duration of the downlink control signal in the first time period; and a signal format of the downlink control signal in the first time period.

In a possible implementation of the fourth aspect, that the processing unit controls the receiving unit whether to listen to the downlink control signal according to the indication information includes: the processing unit controls the receiving unit to listen to the downlink control signal in the first time period, when the indication information indicates that the existence status of the downlink control signal in the first time period includes at least one of the following: that the downlink control signal exists in the first time period; the time resource location of the downlink control signal in the first time period; the frequency resource location of the downlink control signal in the first time period; the quantity of transmissions of the downlink control signal in the first time period; the quantity of repetitions of the downlink control signal in the first time period; the transmission duration of the downlink control signal in the first time period; and the signal format of the downlink control signal in the first time period; or when the indication information indicates that the downlink control signal does not exist in the first time period, the processing unit controls the receiving unit to skip listening to the downlink control signal in the first time period.

In a possible implementation of the fourth aspect, the time resource location of the downlink control signal in the first time period is a start location of the downlink control signal in the first time period or a candidate number of the downlink control signal in the first time period.

In a possible implementation of the fourth aspect, a start location of the first time period is a first time location after a transmission end moment of the indication information, and a length of the first time period is a positive integer quantity of downlink control channel periods.

In a possible implementation of the fourth aspect, an interval between the first time location and a last subframe in which the indication information is transmitted is indicated based on a system message or high layer signaling and/or is determined according to a preset rule.

In a possible implementation of the fourth aspect, the downlink control signal is scrambled by using a random access radio network temporary identifier, a cell radio network temporary identifier, a temporary cell radio network temporary identifier, a group radio network temporary identifier, a single cell radio network temporary identifier, or a paging radio network temporary identifier.

In a possible implementation of the fourth aspect, configuration information of the indication information is indicated based on the system message or other high layer signaling and/or is determined according to the preset rule.

In a possible implementation of the fourth aspect, the configuration information of the indication information is indicated in a first message, and the first message includes configuration information of downlink control signal search space indicated by the indication information.

According to a fifth aspect, this disclosure provides a computer-readable storage medium, including an instruction, where when the instruction is run on a computer, the computer is enabled to perform the first aspect, the second aspect, any possible implementation of the first aspect, or any possible implementation of the second aspect.

In the implementations of the foregoing aspects of this disclosure, the network device sends the indication information to the terminal device, where the indication information is used to indicate whether a PDCCH signal exists and is used to transmit the configuration information, so that the terminal device can be more targeted before listening to the PDCCH signal, and listen to the downlink control signal according to an indication of the indication information, thereby reducing power consumption in detecting and listening to the downlink control signal. In addition, because the indication information carries a relatively small quantity of bits, the terminal device can receive the indication information with relatively low power consumption, so as to further reduce power consumption of the terminal.

DETAILED DESCRIPTION OF ILLUSTRATIVE EMBODIMENTS

A terminal device in the embodiments of this disclosure may be a device that provides a user with voice and/or data connectivity, a handheld device with a radio connection function, or another processing device connected to a wireless modem. A wireless terminal may communicate with one or more core networks by using a radio access network (RAN). The wireless terminal may be a mobile terminal such as a mobile phone (or referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal (Remote Terminal), an access terminal, a user terminal, a user agent, a user device, or user equipment.

A network device (for example, an access point) in the embodiments of this disclosure may be a device in the access network that communicates with the wireless terminal on an air interface by using one or more sectors. The network device may be configured to mutually convert a received over-the-air frame and an IP packet, and is used as a router between the wireless terminal and the remaining part of the access network. The remaining part of the access network may include an internet protocol (IP) network. The network device may further coordinate attribute management of the air interface. For example, the network device may be a base station (BTS) in GSM or CDMA, or may be a NodeB in WCDMA, or may be an evolved NodeB (eNB or e-NodeB) in LTE. This is not limited in this disclosure.

Although the foregoing content is described by using an LTE system as an example, a person skilled in the art should know that this disclosure is not only applicable to the LTE system, but is also applicable to other wireless communications systems, for example, a global system for mobile communications (GSM), a universal mobile telecommunications system (UMTS), a code division multiple access (CDMA) system, and a new network system. The following describes a specific embodiment by using the LTE system as an example.

Figure 1:
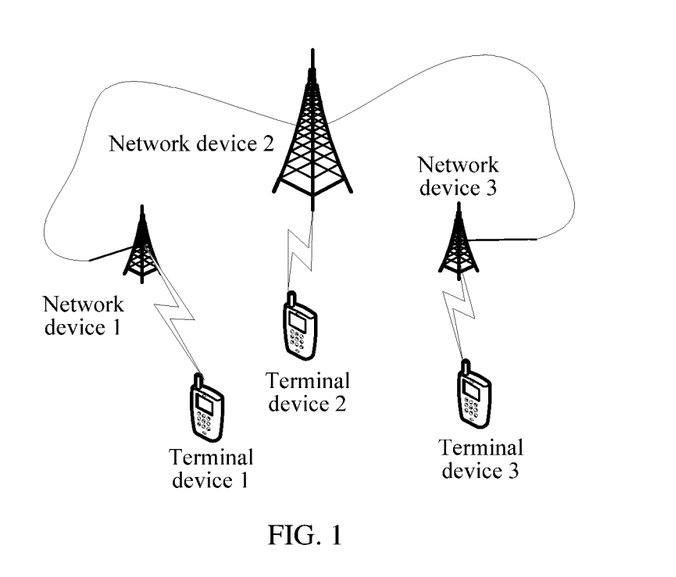
FIG. 1 is a schematic diagram of an architecture of a wireless communications system according to an embodiment of this disclosure.

In a schematic diagram of an architecture of a wireless communications system shown in FIG. 1, a network device, for example, various transmission reception points (TRP) such as a base station or a wireless local area network access point, provides a terminal device with an access service in a licensed spectrum or an access service in an unlicensed spectrum. The terminal device and the network device transmit various data such as control signaling or service data on an uplink and a downlink based on protocol layers. The control signaling is mainly transmitted on a control channel, and the service data is mainly transmitted on a service channel. These protocol layers include a physical layer, a media access control (MAC) layer, a radio resource control (RRC) layer, and the like. Data transmitted on any layer is finally carried on the physical layer and then transmitted in wireless space by using at least one physical antenna.

Figure 2:
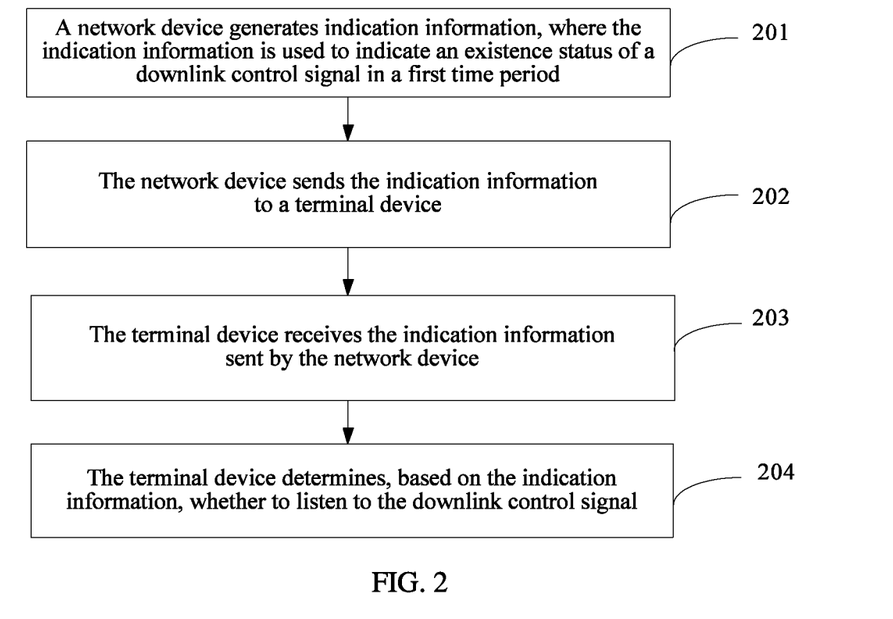
FIG. 2 is a schematic flowchart of an indication information transmission method according to an embodiment of this disclosure.

In view of the foregoing technical problem, an aspect of the embodiments of this disclosure provides an indication information transmission method, to enable a terminal device to listen to a downlink control channel with lower power consumption. As shown in FIG. 2, the indication information transmission method may be applied to the network architecture shown in FIG. 1. The method includes the following steps.

Step 201: A network device generates indication information, where the indication information is used to indicate an existence status of a downlink control signal in a first time period.

Optionally, the existence status of the downlink control signal in the first time period may include at least one of the following:

a time resource location of the downlink control signal in the first time period;

a frequency resource location of the downlink control signal in the first time period;

a quantity of transmissions of the downlink control signal in the first time period;

a quantity of repetitions of the downlink control signal in the first time period;

transmission duration of the downlink control signal in the first time period; and a signal format of the downlink control signal in the first time period.

Optionally, the existence status of the downlink control signal PDCCH in the first time period includes: indicating whether the downlink control signal exists or does not exist in the first time period.

Specifically, for a PDCCH for scheduling a paging signal in an NB-IoT system, the network device sends a PDCCH signal to the terminal device by using type 1 common search space (Type1-CSS). The PDCCH signal is usually scrambled by using a paging radio network temporary identifier (PRNTI). A method for scrambling a PDCCH by using a PRNTI may be: scrambling a cyclic redundancy check (CRC) of the PDCCH by using the PRNTI, and the like. In this disclosure, the method may be used to scramble the PDCCH by using other radio network temporary identifiers (RNTI). Details are not described. A location at which the network device sends the PDCCH for scheduling the paging signal is referred to as a paging Occasion (PO). On one PO, the PDCCH signal may exist or may not exist. When the network device needs to page a particular terminal device or several particular terminal devices on this PO, the PDCCH signal exists. Alternatively, when the network device needs to notify the terminal device of a change in a system message on this PO, the PDCCH signal also exists. However, if the network device does not need to page any terminal device on this PO, and a system message does not change, the network device may not send the PDCCH signal on this PO to save resources. However, for the terminal device, even if no PDCCH is transmitted on this PO, the terminal device still needs to listen to the Type1-CSS before learning that no PDCCH is transmitted. A process of listening to the Type1-CSS causes power consumption of the terminal device, and such the power consumption is unnecessary for the terminal device.

Therefore, for the PDCCH for the paging signal, the indication information is used to indicate, to the terminal device before the PO or at a location of the PO, whether a valid PDCCH signal exists on the PO. If the valid PDCCH signal exists, the terminal device listens to the PDCCH signal. If the valid PDCCH signal does not exist, the terminal device does not listen to the PDCCH signal. The indication of the indication information enables the terminal device to be more targeted in listening to the PDCCH, so as to avoid listening to the downlink control signal unnecessarily, and reduce power consumption.

For a PDCCH signal that is in NB-IoT and that is used to schedule a common downlink data signal or uplink data signal, the network device sends the PDCCH signal to the terminal device by using user-level search space (USS). The PDCCH signal is usually scrambled by using a cell radio network temporary identifier (C-RNTI). In a USS period, the PDCCH signal may exist or may not exist. This is because the network device may or may not schedule a particular terminal device in the USS. However, from a perspective of the terminal device, for USS in which scheduling may occur, even if no valid PDCCH is transmitted in the USS, the terminal device still needs to listen to the entire USS before learning that there is no valid PDCCH. A process of listening to the USS causes power consumption of the terminal device, and such power consumption is unnecessary for the terminal device.

It should be noted that, in this disclosure, a period of downlink control signal search space is a PDCCH period corresponding to the search space. For example, the USS period is equivalent to a PDCCH period corresponding to the USS. The PDCCH period is usually notified by a network side device to the terminal device by using the system message or other signaling. This is no longer repeated in other parts of this disclosure. It should be additionally noted that the valid PDCCH in the search space has the following meaning: For example, for USS, a valid PDCCH in particular USS of a terminal device is a PDCCH scrambled by using a C-RNTI of the terminal device in the USS. This is similar for other search space, and details are not described.

Therefore, for a PDCCH for scheduling a common downlink data signal or uplink data signal, the indication information is used to indicate, to the terminal device before the USS, whether a valid PDCCH signal exists in the USS. If the valid PDCCH signal exists, the terminal device listens to the PDCCH signal. If the valid PDCCH signal does not exist, the terminal device does not listen to the PDCCH signal. The indication of the indication information enables the terminal device to be more targeted in listening to the PDCCH, so as to avoid listening to the downlink control signal unnecessarily, and reduce power consumption. A case for a PDCCH for scheduling a data signal on a single cell multicast traffic channel (SC-MTCH), for a PDCCH for scheduling a data signal on a single cell multicast control channel (SC-MCCH), or for a PDCCH for scheduling a signal in a random access procedure is similar to that of the USS. Details are not described again. The signal in the random access procedure includes a random access response (RAR), a message 3, a message 4, or the like.

Optionally, the indication information is used to indicate a quantity of repetitions or transmission duration of the PDCCH in the first time period. In some communications systems such as the NB-IoT, a signal often needs to be repeatedly sent to improve robustness of a receive end in receiving the signal. A PDCCH signal for scheduling is also repeatedly used for a particular quantity of times, and different quantities of repetitions mean different PDCCH transmission duration. Therefore, there is a correspondence between a quantity of repetitions and transmission duration. In the current system, when the terminal device listens to a PDCCH signal for paging information, even if PDCCH signal transmission does exist, the terminal does not learn of a specific quantity of repetitions used for PDCCH transmission. For example, there are four possible quantities of repetitions for the PDCCH signal transmission. The terminal needs to perform blind detection on the PDCCH signal to learn of a specific quantity of repetitions of the PDCCH signal. The blind detection performed by the terminal device because of this is a waste of power consumption. Therefore, using the indication information to indicate a quantity of repetitions or transmission duration of the PDCCH signal can enable the terminal device to reduce a quantity of blind detections, so as to reduce power consumption.

Optionally, the indication information is used to indicate a change status of a signal format or a system message of the PDCCH signal in the first time period. In the current system, there are two formats for a PDCCH for a paging signal, a format 1 is used to schedule paging information, and a format 2 is used to indicate a change status of a system message. When there is no paging information but a change occurs in the system message, the network device sends the PDCCH in the format 2, to indicate the change in the system message to the terminal device. However, to obtain only the information about the change in the system message, the terminal device needs to receive the PDCCH signal. Relatively high power consumption usually needs to be caused to receive the PDCCH signal. This has the following reasons: First, as a control channel, the PDCCH usually needs to satisfy relatively high reception performance. Therefore, transmission duration of the PDCCH is usually long, and relatively high power consumption of the terminal device is caused for receiving. Second, because paging is cell-level behavior, a terminal device with a poor environment and poor coverage needs to be considered. Therefore, a relatively conservative transmission policy is used for transmission for a PDCCH for a paging signal. In other words, relatively long transmission duration is needed.

Therefore, the indication information is used to indicate the change status of the signal format or the system message of the PDCCH. For example, when the indication information indicates that the system message changes, or indicates that the PDCCH is in the format 2, the terminal may learn, without needing to continue listening to the PDCCH signal, that the system message changes, and directly update the system message. In this way, power consumption of the terminal in re-reading the PDCCH signal is reduced.

Optionally, the indication information may be alternatively used to indicate a time resource location of the PDCCH signal in the first time period. For example, even if a valid PDCCH exists in search space, the PDCCH may have various possible start locations. The terminal device does not learn of a specific location of the PDCCH when listening to the search space, and needs to perform blind detection on the PDCCH. Sometimes, the terminal device needs to listen to the end of the search space before receiving the PDCCH signal, causing unnecessary power consumption. Therefore, a function of the indication information may be indicating the time resource location of the PDCCH. The time resource location may be a start location of the PDCCH, or a candidate number of a location that is of the PDCCH and that is indicated according to a preset candidate number rule, or any other parameter that can achieve a similar indication function. It should be explained herein that the start location of the PDCCH is not necessarily a start location for actually sending the PDCCH, but the terminal device may deduce, based on the start location of the PDCCH, the start location for actually sending the PDCCH. Similar problems are not described in other parts of this disclosure.

Optionally, the indication information may be alternatively used to indicate a quantity of transmissions of the PDCCH in the first time period. When the first time period is greater than or equal to one PDCCH period, the indication information may be used to indicate a total quantity of valid PDCCH transmissions in the first time period. The quantity of transmissions is different from the quantity of repetitions. The quantity of transmissions is a quantity of valid transmissions of the PDCCH, and the quantity of repetitions is a quantity of repetitions of the PDCCH in one transmission.

Optionally, a length of the first time period may be a positive integer multiple of paging discontinuous reception (DRX) periods. Because the PO is usually periodically distributed, a period of the PO is a DRX period configured by the network device. Therefore, optionally, the indication information may indicate whether a PDCCH (a PDCCH for scheduling paging information) exists in one or more future paging DRX periods. Particularly, if the terminal device supports an extended DRX (eDRX) configuration, the length of the first time period may be alternatively a positive integer multiple of eDRX periods. Certainly, the length of the first time period may be alternatively a non-integer multiple of paging DRX periods or eDRX periods, for example, a half paging DRX period or eDRX period.

Optionally, the length of the first time period may be a positive integer multiple of PDCCH periods. Because PDCCH search space is usually periodically distributed, the period is a PDCCH period configured by a base station. For example, for the USS, the PDCCH period is indicated in dedicated RRC signaling. A PDCCH period of the PDCCH for scheduling the SC-MTCH data signal is indicated in an SC-MCCH. A PDCCH period of the PDCCH for scheduling the SC-MCCH data signal is indicated in the system message. A PDCCH period of the PDCCH for scheduling the signal in the random access procedure is indicated in the system message. Therefore, relatively naturally, the indication information may indicate whether a PDCCH exists in one or more future PDCCH periods. Certainly, the length of the first time period may be alternatively a non-integer multiple of PDCCH periods, for example, a half PDCCH period.

Optionally, a start location of the first time period may be a transmission end moment of the indication information, or may be a particular moment after a transmission end moment of the indication information. The terminal device may determine the start location of the first time period according to the indication information and/or a predetermined rule. Optionally, the transmission end moment of the indication information may be the end of a last subframe in which the indication information is transmitted. An interval between a particular moment after the transmission end moment of the indication information and the transmission end moment of the indication information is indicated based on the system message or high signaling and/or is determined according to a preset rule.

Step 202: The network device sends the indication information to a terminal device.

Configuration information of the indication information may be used to indicate at least one of the following: a start time resource location, a frequency resource location, transmission duration, existence or non-existence of the downlink control signal, and a period configuration in the indication information. The configuration information or a part of the configuration information may be indicated in the system message or other RRC signaling.

Optionally, the configuration information of the indication information or a part of the configuration information may be indicated in signaling carrying configuration information of the downlink control signal search space. The search space may be search space indicated by the indication information. For example, in the NB-IoT, configuration information or a part of configuration information of indication information of the PDCCH for the paging information may be indicated in signaling carrying configuration information of the Type1-CSS, in other words, may be indicated in a system information block 2 (System Information Block 2-Narrow Band, SIB2-NB). Further, optionally, the configuration information or the part of the configuration information of the indication information of the PDCCH for the paging information may be indicated in an information element RadioResourceConfigCommonSIB-NB in SIB2-NB.

For another example, in the NB-IoT, configuration information or a part of configuration information of the indication information used to indicate the PDCCH for scheduling the common downlink data signal or the uplink data signal may be indicated in signaling carrying configuration information of the USS, in other words, may be indicated in DL-DCCH-Message-NB or UL-DCCH-Message-NB. Further, optionally, the configuration information or the part of the configuration information of the indication information may be indicated in an information element RRCConnectionReconfiguration-NB of the DL-DCCH-Message-NB or the UL-DCCH-Message-NB. Further, optionally, the configuration information or the part of the configuration information of the indication information may be indicated in an information element RadioResourceConfigDedicated-NB in RRCConnectionReconfiguration-NB. Further, optionally, the configuration information or the part of the configuration information of the indication information may be indicated in an information element PhysicalConfigDedicated-NB in RadioResourceConfigDedicated-NB. Further, optionally, the configuration information or the part of the configuration information of the indication information may be indicated in an information element NPDCCH-ConfigDedicated-NB in PhysicalConfigDedicated-NB. Further, optionally, the configuration information or the part of the configuration information of the indication information may be indicated in npdcch-NumRepetitions-r13 in NPDCCH-ConfigDedicated-NB.

For another example, in the NB-IoT, configuration information or a part of configuration information of indication information used to indicate the PDCCH for scheduling the signal in the random access procedure may be indicated in signaling carrying configuration information of a Type2-CSS, in other words, may be indicated in a system information block 2 (System Information Block 2-Narrow Band, SIB2-NB). Further, optionally, the configuration information or the part of the configuration information of the indication information of the PDCCH may be indicated in an information element RadioResourceConfigCommonSIB-NB in SIB2-NB. Further, optionally, the configuration information or the part of the configuration information of the indication information of the PDCCH may be indicated in NPRACH-ConfigSIB-NB-r13 in RadioResourceConfigCommonSIB-NB.

For another example, in the NB-IoT, configuration information or a part of configuration information of indication information used to indicate the PDCCH of the SC-MTCH may be indicated in signaling carrying configuration information of a Type2A-CSS, to be specific, may be indicated in the SC-MCCH.

Optionally, the indication information may be an optional function. In other words, the indication information may not be used in some downlink control signal search space. In a possible implementation method, the network device indicates, in the configuration information of the indication information, whether the indication information is supported (in other words, whether the indication information exists). Optionally, a sending period of the indication information may also be indicated in the configuration information.

Optionally, the indication information and downlink control signal search space indicated by the indication information may be sent on a same frequency resource or on different frequency resources. The frequency resource location for sending the indication information may be predetermined, or may be indicated by the network device. For example, the network device may indicate the frequency resource location in the system message or other higher layer signaling, or the frequency resource location is determined according to both the predetermined rule and an indication of the network device.

Optionally, the start time resource location for sending the indication information may be a time location before a start time of the downlink control signal search space indicated by the indication information, or a start time of the downlink control signal search space indicated by the indication information, or a time location after a start time of the downlink control signal search space indicated by the indication information. The start time resource location for sending the indication information may be predetermined, or may be indicated by the network device, where for example, the network device may indicate the start time resource location in the system message or other higher layer signaling, or may be determined according to both the predetermined rule and the indication of the network device.

Optionally, the transmission duration in the indication information may be predetermined, or may be indicated by the network device, where for example, the network device may indicate the transmission duration in the system message or other higher layer signaling, or may be determined according to both a predetermined rule and an indication of the network device.

The other higher layer signaling may be SC-MCCH signaling, dedicated RRC signaling, or other RRC signaling.

Step 203: The terminal device receives the indication information sent by the network device.

The indication information may include at least one segment of sequence. The at least one segment of sequence belongs to a candidate sequence set. The candidate sequence set is predetermined, or indicated by the system message, or determined according to both a predetermined rule and an indication of the system message. The candidate sequence set includes at least one candidate sequence. Different candidate sequences may indicate different information. For example, the candidate sequence set includes at least two candidate sequences, where a candidate sequence 1 indicates that a valid PDCCH exists in the first time period, and a candidate sequence 2 indicates that no valid PDCCH exists in the first time period. For another example, the candidate sequence set includes at least one candidate sequence, where the candidate sequence indicates that a valid PDCCH exists in the first time period. For another example, the candidate sequence set includes at least two candidate sequences, where a candidate sequence 1 indicates that a valid PDCCH exists in the first time period and is in a format 1, to be specific, the valid PDCCH is a PDCCH for scheduling paging information; a candidate sequence 2 indicates that a valid PDCCH exists in the first time period and is in a format 2, to be specific, the valid PDCCH is a PDCCH for indicating a change in the system message, and the like. The candidate sequence may be a pseudo random sequence, such as an m sequence, an M sequence, or a Gold sequence, or may be a Zadoff-Chu sequence, or may be an orthogonal sequence (such as a Hadamard sequence or a Walsh code sequence), or the like. The candidate sequence may be alternatively a conjugate sequence, a cyclic shift sequence, or the like of the foregoing sequence. The candidate sequence may be alternatively a sequence determined based on the foregoing sequence. In other words, the candidate sequence may be a function of the foregoing sequence.

The indication information may be alternatively a data packet, namely, a transport block formed after an original information bit is encoded or modulated or undergoes another process. The original information bit of the indication information may indicate different information by using a bit value of the original information bit. For example, the original information bit of the indication information includes at least 1 bit, and when the bit value is '0', it indicates that no valid PDCCH is transmitted in the first time period, or when the bit value is '1', it indicates that a valid PDCCH is transmitted in the first time period, or bit meanings are exchanged. For another example, the original information bit of the indication information includes at least 1 bit, and when the bit value is '0', it indicates that a valid PDCCH is transmitted in the first time period and is in the format 1, in other words, the valid PDCCH is the PDCCH for scheduling the paging information; or when the bit value is '1', it indicates that a valid PDCCH is transmitted in the first time period and is in the format 2, in other words, the valid PDCCH is the PDCCH for indicating the change in the system message, or bit meanings are exchanged. For another example, the original information bit of the indication information includes at least 2 bits, and when the 2-bit value is '00', it indicates that no valid PDCCH is transmitted in the first time period; when the bit value is '01', it indicates that a valid PDCCH is transmitted in the first time period and is in the format 1, in other words, the valid PDCCH is the PDCCH for scheduling the paging information; or when the bit value is '10', it indicates that a valid PDCCH is transmitted in the first time period and is in the format 2, in other words, the valid PDCCH is the PDCCH for indicating the change in the system message; and so on. It should be explained that, in the example of all bit fields of this disclosure, a bit value indicating a meaning is not limited to the method in the example. For example, a bit value indicating that a valid PDCCH is transmitted may be '0', '1', or the like. Details are not described again in other parts of this disclosure.

The indication information may be alternatively an energy detection signal. To be specific, the network device may not send the indication information at a resource location of the indication information. For example, when no valid PDCCH is transmitted in the first time period, the network device may not send the indication information. When detecting no indication information, the terminal device considers that no valid PDCCH is transmitted in the first time period.

Step 204: The terminal device determines, according to the indication information, whether to listen to the downlink control signal.

As described above, the indication information may be used to indicate a plurality of cases. Optionally, the terminal device does not listen to the downlink control signal in the first time period when the indication information indicates that the downlink control signal does not exist in the first time period. The terminal device may listen to the downlink control signal in the first time period when the indication information indicates that the existence status of the downlink control signal in the first time period includes, for example, at least one of the following: the existence, the time resource location, the frequency resource location, the quantity of transmissions, the quantity of repetitions, the transmission duration, and the signal format.

Optionally, the PDCCH of the paging signal is scrambled by using a paging RNTI (P-RNTI). A PDCCH of a non-paging signal, for example, a PDCCH for scheduling a common downlink data signal, is scrambled by using a C-RNTI. Alternatively, a PDCCH for scheduling an uplink data signal is scrambled by using a C-RNTI. Alternatively, the PDCCH for scheduling the SC-MTCH data signal is scrambled by using a group RNTI (GRNTI). Alternatively, the PDCCH for scheduling the SC-MCCH data signal is scrambled by using a single cell RNTI (SC-RNTI). Alternatively, the PDCCH for scheduling the signal in the random access procedure is scrambled by using a random access RNTI (RA-RNTI), a TC-RNTI, or a C-RNTI.

In this embodiment of this disclosure, the network device sends the indication information to the terminal device, where the indication information is used to indicate whether a PDCCH signal exists and is used to transmit the configuration information, so that the terminal device can be more targeted before listening to the PDCCH signal, and listen to the downlink control signal according to an indication of the indication information, thereby reducing power consumption in detecting and listening to the downlink control signal. In addition, because the indication information carries a relatively small quantity of bits, the terminal device can receive the indication information with relatively low power consumption, so as to further reduce power consumption of the terminal.

Figure 3:
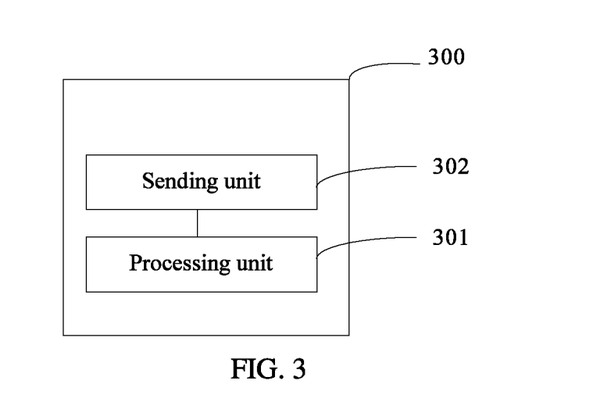
FIG. 3 is a schematic structural diagram of a network device according to an embodiment of this disclosure.

Referring to FIG. 3, an embodiment of this disclosure provides a network device 300. The network device 300 includes a processing unit 301, configured to generate indication information, where the indication information is used to indicate an existence status of a downlink control signal in a first time period; and a sending unit 302, configured to send the indication information to a terminal device.

The existence status includes at least one of the following: existence, non-existence, a time resource location, a frequency resource location, a quantity of transmissions, a quantity of repetitions, transmission duration, and a signal format of the downlink control signal in the first time period.

For content that the indication information is used to indicate the foregoing at least one existence status of the downlink control signal in the first time period, refer to related content in step 201. Details are not described herein again.

Optionally, the time resource location of the downlink control signal in the first time period is a start location of the downlink control signal in the first time period or a candidate number of the downlink control signal in the first time period.

Optionally, a start location of the first time period is a first time location after a transmission end moment of the indication information, and a length of the first time period is a positive integer quantity of downlink control channel periods. Optionally, an interval between the first time location and a last subframe in which the indication information is transmitted is indicated based on a system message or high layer signaling and/or is determined according to a preset rule.

For content related to the time resource location of the downlink control signal in the first time period and the length and the start location of the first time period, refer to related content in step 202. Details are not described herein again.

Optionally, the downlink control signal is scrambled by using a random access radio network temporary identifier, a cell radio network temporary identifier, a temporary cell radio network temporary identifier, a group radio network temporary identifier, a single cell radio network temporary identifier, or a paging radio network temporary identifier.

Optionally, configuration information of the indication information is indicated in the system message or other higher layer signaling, or is determined according to the preset rule. The other higher layer signaling is single cell multicast control channel signaling, dedicated radio resource control signaling, or other radio resource control signaling.

Figure 4:
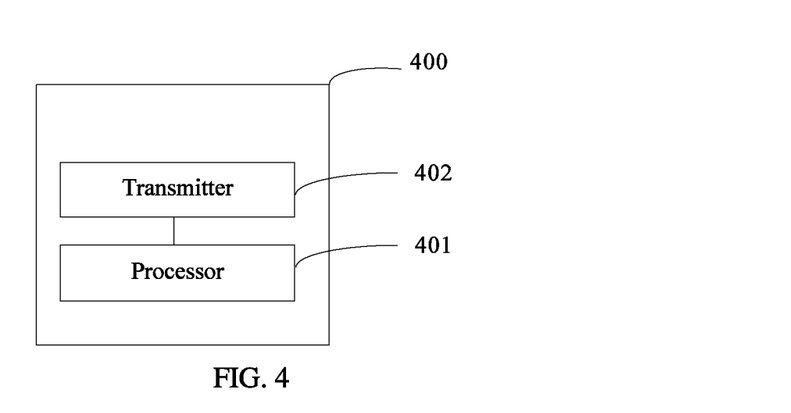
FIG. 4 is a schematic structural diagram of a network device according to an embodiment of this disclosure.

It should be noted that the network device 300 provided in this embodiment of this disclosure may perform various actions of the network device in the foregoing method embodiment. The sending unit 302 is configured to perform a sending action of the network device in the foregoing method embodiment. The processing unit 301 is configured to perform a processing action such as obtaining or determining in the foregoing method embodiment. During physical implementation, the sending unit 302 may be a transmitter, and the processing unit 301 may be a processor. As shown in FIG. 4, 400 is a network device, and the network device includes a processor 401 and a transmitter 402. The processor 401 and the transmitter 402 are connected through various electronic line interfaces (such as a bus).

In this embodiment of this disclosure, the network device sends the indication information to the terminal device, where the indication information is used to indicate whether a PDCCH signal exists and is used to transmit the configuration information, so that the terminal device can be more targeted before listening to the PDCCH signal, and listen to the downlink control signal according to an indication of the indication information, thereby reducing power consumption in detecting and listening to the downlink control signal. In addition, because the indication information carries a relatively small quantity of bits, the terminal device can receive the indication information with relatively low power consumption, so as to further reduce power consumption of the terminal.

Figure 5:
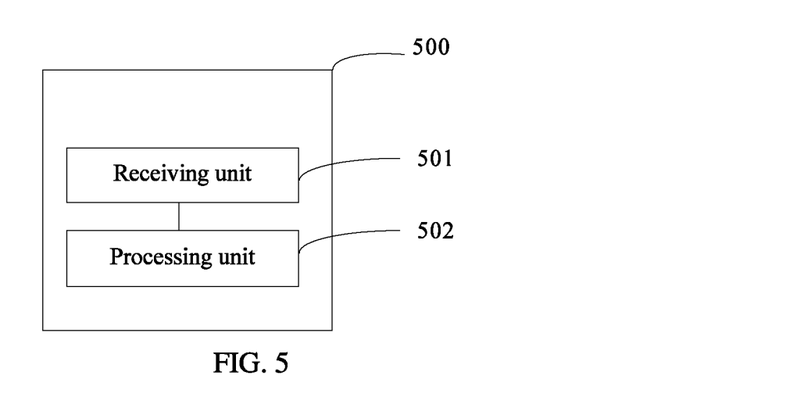
FIG. 5 is a schematic structural diagram of a terminal device according to an embodiment of this disclosure.

Referring to FIG. 5, an embodiment of this disclosure provides a terminal device 500. The terminal device 500 includes: a receiving unit 501, configured to receive indication information sent by a network device, where the indication information is used to indicate an existence status of a downlink control signal in a first time period; and a processing unit 502, configured to instruct, according to the indication information, the receiving unit whether to receive the downlink control signal.

For content included in the existence status, refer to related content in the network device 300. For content that the indication information is used to indicate the foregoing at least one existence status of the downlink control signal in the first time period, refer to related content in step 201. Details are not described herein again.

In a possible implementation, the processing unit 502 is further configured to instruct the receiving unit 501 to receive the downlink control signal in the first time period, when the indication information indicates that the existence status of the downlink control signal in the first time period includes at least one of the following: existence, a time resource location, a frequency resource location, a quantity of transmissions, a quantity of repetitions, transmission duration, and a signal format.

For related content of the indication information and the downlink control signal, refer to related content in the network device 300. For content related to the time resource location of the downlink control signal in the first time period, and a length and a start location of the first time period, refer to related content in step 202. Details are not described herein again.

Figure 6:
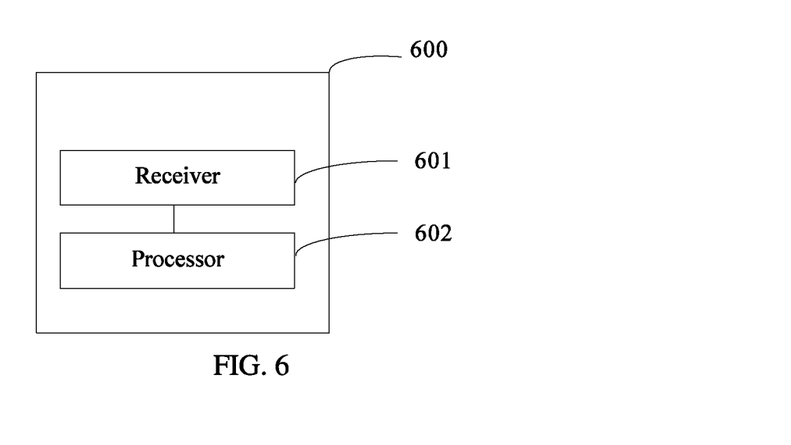
FIG. 6 is a schematic structural diagram of a terminal device according to an embodiment of this disclosure.

It should be noted that the terminal device 500 provided in this embodiment of this disclosure may perform various actions of the terminal device in the foregoing method embodiment. The receiving unit 501 is configured to perform a receiving action of the terminal device in the foregoing method embodiment. The processing unit 502 is configured to perform a processing action such as obtaining or determining of the terminal device in the foregoing method embodiment. During physical implementation, the receiving unit 501 may be a receiver, and the processing unit 502 may be a processor. As shown in FIG. 6, 600 is a terminal device, and the terminal device includes a processor 602 and a receiver 601. The processor 602 and the receiver 601 are connected through various electronic line interfaces (such as a bus).

In this embodiment of this disclosure, the terminal device receives the indication information sent by the network device, where the indication information is used to indicate whether a PDCCH signal exists and is used to transmit the configuration information, so that the terminal device can be more targeted according to the indication information before listening to the PDCCH signal, and listen to the downlink control signal according to an indication of the indication information, thereby reducing power consumption in detecting and listening to the downlink control signal. In addition, because the indication information carries a relatively small quantity of bits, the terminal device can receive the indication information with relatively low power consumption, so as to further reduce power consumption of the terminal.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center wiredly (for example, by using a coaxial cable, an optical fiber, or a digital subscriber line (DSL)) or wirelessly (for example, through infrared, radio, or microwave). The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

The foregoing descriptions are merely examples of this disclosure, but are not intended to limit this disclosure. Any modification, equivalent replacement, or improvement made without departing from the spirit and principle of this disclosure should fall within the protection scope of this disclosure.

What is claimed is:

1. A method comprising:
generating, by a network device, indication information when a downlink control signal needs to be transmitted in a first time period; and
sending, by the network device, the indication information to a terminal device when the downlink control signal needs to be transmitted in the first time period, the indication information indicates the terminal device to listen to the downlink control signal in the first time period, and the network device does not send the indication information when no downlink control signal needs to be transmitted in the first time period, wherein a start location of the first time period is a first time location after a transmission end moment of the indication information, and a length of the first time period is a positive integer and is equal to a quantity of discontinuous reception periods.

2. The method according to claim 1, wherein the downlink control signal is scrambled with a paging radio network temporary identifier.

3. The method according to claim 1, wherein the indication information includes at least one segment of sequence, at least one segment of sequence is a Gold sequence or a Zadoff-Chu sequence.

4. The method according to claim 1, wherein configuration information of the indication information and configuration information of a downlink control signal search space are indicated in a system message.

5. A method comprising:
determining, by a terminal device, whether to listen to a downlink control signal in a first time period according to whether indication information is received; and
listening, by the terminal device, to the downlink control signal in the first time period when the indication information is received by the terminal device, and the terminal device does not listen to the downlink control signal when the indication information is not received by the terminal device, wherein a start location of the first time period is a first time location after a transmission end moment of the indication information, and a length of the first time period is a positive integer and is equal to a quantity of discontinuous reception periods.

6. The method according to claim 5, wherein the downlink control signal is scrambled with a paging radio network temporary identifier.

7. The method according to claim 5, wherein configuration information of the indication information is determined according to a system message.

8. The method according to claim 7, wherein the system message further comprises configuration information of a downlink control signal search space.

9. The method according to claim 5, wherein the indication information includes at least one segment of sequence, at least one segment of sequence is a Gold sequence or a Zadoff-Chu sequence.

10. A network device comprising:
a processor; and
a non-transitory computer-readable storage medium storing a program to be executed by the processor, the program including instructions to:
generate indication information when a downlink control signal needs to be transmitted in a first time period; and
a transceiver configured to send the indication information to a terminal device when the downlink control signal needs to be transmitted in the first time period, the indication information indicates the terminal device to listen to the downlink control signal in the first time period, and the transceiver configured not to send the indication information when no downlink control signal needs to be transmitted in the first time period, wherein a start location of the first time period is a first time location after a transmission end moment of the indication information, and a length of the first time period is a positive integer and is equal to a quantity of discontinuous reception periods.

11. The network device according to claim 10, wherein the downlink control signal is scrambled with a paging radio network temporary identifier.

12. The network device according to claim 10, wherein configuration information of the indication information is determined according to a system message.

13. The network device according to claim 12, wherein the configuration information of the indication information is indicated in a first message, and the first message comprises configuration information of a downlink control signal search space indicated by the indication information.

14. The network device according to claim 10, wherein the indication information includes at least one segment of sequence, at least one segment of sequence is a Gold sequence or a Zadoff-Chu sequence.

15. The network device according to claim 10, wherein configuration information of the indication information and configuration information of a downlink control signal search space are indicated in a system message.

16. A terminal device, comprising:
a processor; and
a non-transitory computer-readable storage medium storing a program to be executed by the processor, the program including instructions to:
determine whether to listen to a downlink control signal according to whether indication information is received; and
listen to the downlink control signal in a first time period when the indication information is received by the terminal device, and the terminal device does not listen to the downlink control signal when the indication information is not received by the terminal device, wherein a start location of the first time period is a first time location after a transmission end moment of the indication information, and a length of the first time period is a positive integer and is equal to a quantity of discontinuous reception periods.

17. The terminal device according to claim 16, wherein the downlink control signal is scrambled with paging radio network temporary identifier.

18. The terminal device according to claim 16, wherein configuration information of the indication information is determined according to a system message.

19. The terminal device according to claim 18, wherein the system message further comprises configuration information of a downlink control signal search space.

20. The terminal device according to claim 16, wherein the indication information includes at least one segment of sequence, at least one segment of sequence is a Gold sequence or a Zadoff-Chu sequence.

* * * * *